(12) United States Patent
Joardar

(10) Patent No.: US 12,460,827 B2
(45) Date of Patent: Nov. 4, 2025

(54) MICROCHANNEL HEAT EXCHANGER FOR HEAT PUMP

(71) Applicant: Carrier Corporation, Palm Beach Gardens, FL (US)

(72) Inventor: Arindom Joardar, Syracuse, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 194 days.

(21) Appl. No.: 18/347,876

(22) Filed: Jul. 6, 2023

(65) Prior Publication Data

US 2024/0011648 A1 Jan. 11, 2024

Related U.S. Application Data

(60) Provisional application No. 63/359,614, filed on Jul. 8, 2022.

(51) Int. Cl.
| | |
|---|---|
| *F24F 1/0067* | (2019.01) |
| *F24F 3/00* | (2006.01) |
| *F28D 1/053* | (2006.01) |
| *F28F 1/02* | (2006.01) |
| *F28F 9/02* | (2006.01) |

(52) U.S. Cl.
CPC ............ *F24F 1/0067* (2019.02); *F24F 3/001* (2013.01); *F28D 1/05383* (2013.01); *F28F 1/022* (2013.01); *F28F 9/0243* (2013.01); *F28F 2260/02* (2013.01)

(58) Field of Classification Search
CPC ........ F25B 2339/044; F25B 2339/0442; F25B 2339/0444; F25B 2339/0446

USPC ...................................................... 62/238.7
See application file for complete search history.

(56) References Cited

U.S. PATENT DOCUMENTS

| | | | |
|---|---|---|---|
| 5,101,640 A | * | 4/1992 | Fukushima ........... F25B 49/027 62/DIG. 17 |
| 9,499,026 B2 | * | 11/2016 | Brodie ............... B60H 1/00907 |
| 9,927,153 B2 | * | 3/2018 | Matsumoto ............... F25B 5/04 |
| 10,247,481 B2 | | 4/2019 | Taras et al. |
| 2013/0283585 A1 | | 10/2013 | Desireddy et al. |
| 2013/0340451 A1 | | 12/2013 | Sapp et al. |
| 2015/0330685 A1 | | 11/2015 | Goel |
| 2015/0354862 A1 | | 12/2015 | Hancock |

(Continued)

FOREIGN PATENT DOCUMENTS

| | | |
|---|---|---|
| CN | 108266922 A | 7/2018 |
| CN | 109813147 A | 5/2019 |

(Continued)

OTHER PUBLICATIONS

Hayase, Gaku, "Study of Micro Channel Heat Exchanger for Automotive Heat Pump System" (2018). International Refrigeration and Air Conditioning Conference. Paper 1864 (Year: 2018).*

*Primary Examiner* — Steve S Tanenbaum
(74) *Attorney, Agent, or Firm* — CANTOR COLBURN LLP

(57) ABSTRACT

A heating, ventilation, and air conditioning (HVAC) system includes a vapor compression cycle comprising a microchannel heat exchanger. A fluid is configured to circulate within the vapor compression cycle in a first direction during a first mode and is configured to circulate within the vapor compression cycle in a second, opposite direction during a second mode. A receiver is integrally formed with the microchannel heat exchanger.

15 Claims, 6 Drawing Sheets

(56) References Cited

U.S. PATENT DOCUMENTS

| | | |
|---|---|---|
| 2016/0054077 A1 | 2/2016 | Saito et al. |
| 2020/0378640 A1 | 12/2020 | Rite |
| 2020/0386454 A1 | 12/2020 | Balderrama |
| 2022/0282938 A1 | 9/2022 | Komuro et al. |

FOREIGN PATENT DOCUMENTS

| | | | | |
|---|---|---|---|---|
| CN | 111879029 A | | 11/2020 | |
| GB | 2382133 B | | 6/2004 | |
| JP | 2000274881 A | * | 10/2000 | ............. F25B 39/04 |
| JP | 2019190764 A | | 10/2019 | |
| JP | 2019190796 A | | 10/2019 | |

* cited by examiner

HEATING MODE

COOLING MODE

MICROCHANNEL HEAT EXCHANGER FOR HEAT PUMP

BACKGROUND

Exemplary embodiments pertain to the art of heat pump air conditioning systems, and more particularly, to refrigerant charge within a heat pump air conditioning system.

Heat pumps are used in a variety applications, for example, in heating, ventilation, and air conditioning (HVAC) systems that provide a desired air temperature in a facility. Such heat pumps commonly include a compressor, evaporator, expansion device, reversing valve, and condenser. Heat pumps input work to the refrigerant, e.g., by driving the compressor, thereby enabling the refrigerant to move heat from a colder heat reservoir to a warmer heat sink. Some heat pumps are provided as "split" systems, having a first heat exchanger arranged inside of the building to be conditioned and a second heat exchanger located outside of the building to be conditioned. When such a heat pump operates in a heating mode, the second heat exchanger operating as an evaporator is disposed outside the building.

Heat pumps typically have a charge imbalance between operation in the heating and cooling modes. The amount of charge optimum for cooling mode is not optimum for the heating mode. This problem is further exacerbated if the indoor and the outdoor heat exchangers have vastly different internal volumes such as when air-conditioning heat pump systems deploy a microchannel heat exchanger in conjunction with a round-tube plate fin heat exchanger. Maintaining a proper refrigerant charge level is important to the safe and efficient operation of an air conditioning system. Improper charge level, either in deficit or in excess, can cause a reduced system energy efficiency and premature compressor failure in some cases. Use of charge management strategies such as receivers, accumulators, compensators etc. are not cost effective and may present significant system integration challenges in some applications such as split residential systems with large separation between the indoor and the outdoor units.

BRIEF DESCRIPTION

According to an embodiment, a heating, ventilation, and air conditioning (HVAC) system includes a vapor compression cycle comprising a microchannel heat exchanger. A fluid is configured to circulate within the vapor compression cycle in a first direction during a first mode and is configured to circulate within the vapor compression cycle in a second, opposite direction during a second mode. A receiver is integrally formed with the microchannel heat exchanger.

In addition to one or more of the features described above, or as an alternative, in further embodiments the first mode is a cooling mode and the second mode is a heating mode.

In addition to one or more of the features described above, or as an alternative, in further embodiments the microchannel heat exchanger further comprises a first manifold, a second manifold, and a plurality of heat exchange tubes extending between and fluidly coupling the first manifold and the second manifold. The plurality of heat exchange tubes have a plurality of discrete flow channels formed therein. A plurality of dummy tubes is mechanically connected to at least one of the first manifold and the second manifold. At least one dummy tube of the plurality of dummy tubes configured as the receiver.

In addition to one or more of the features described above, or as an alternative, in further embodiments the at least one dummy tube configured as the receiver is fluidly connected to the second manifold but not the first manifold.

In addition to one or more of the features described above, or as an alternative, in further embodiments the second manifold is operable as an inlet header during operation of the vapor compression cycle in the second mode.

In addition to one or more of the features described above, or as an alternative, in further embodiments a configuration of the at least one dummy tube configured as the receiver is substantially identical to the configuration of one of the plurality of heat exchange tubes.

In addition to one or more of the features described above, or as an alternative, in further embodiments a configuration of the at least one dummy tube configured as the receiver is different than the configuration of one of the plurality of heat exchange tubes.

In addition to one or more of the features described above, or as an alternative, in further embodiments the at least one dummy tube configured as the receiver has a substantially hollow interior.

In addition to one or more of the features described above, or as an alternative, in further embodiments at least one of a size and shape of the at least one dummy tube configured as the receiver is different from the size and shape of the plurality of heat exchange tubes.

In addition to one or more of the features described above, or as an alternative, in further embodiments the at least one dummy tube configured as the receiver further comprises a plurality of dummy tubes including a first dummy tube and a second dummy tube.

In addition to one or more of the features described above, or as an alternative, in further embodiments the first dummy tube and the second dummy tube are arranged at a same side of the microchannel heat exchanger.

In addition to one or more of the features described above, or as an alternative, in further embodiments the first dummy tube and the second dummy tube are arranged at opposite sides of the microchannel heat exchanger.

In addition to one or more of the features described above, or as an alternative, in further embodiments the first dummy tube and the second dummy tube are fluidly coupled at a location offset from the first manifold and the second manifold.

In addition to one or more of the features described above, or as an alternative, in further embodiments the HVAC system is a heat pump having an indoor unit and an outdoor unit, the microchannel heat exchanger being arranged within the indoor unit.

In addition to one or more of the features described above, or as an alternative, in further embodiments the vapor compression cycle further comprises another heat exchanger, wherein an inner volume of the another heat exchanger is different than the inner volume of the microchannel heat exchanger.

In addition to one or more of the features described above, or as an alternative, in further embodiments the vapor compression cycle further comprises another heat exchanger, wherein the another heat exchanger is a different type than the microchannel heat exchanger.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

It is a primary object of the present disclosure to improve charge balance of the air source heat pumps deploying microchannel heat exchanger and more specifically, as evaporator in the cooling mode.

Figure 1B:
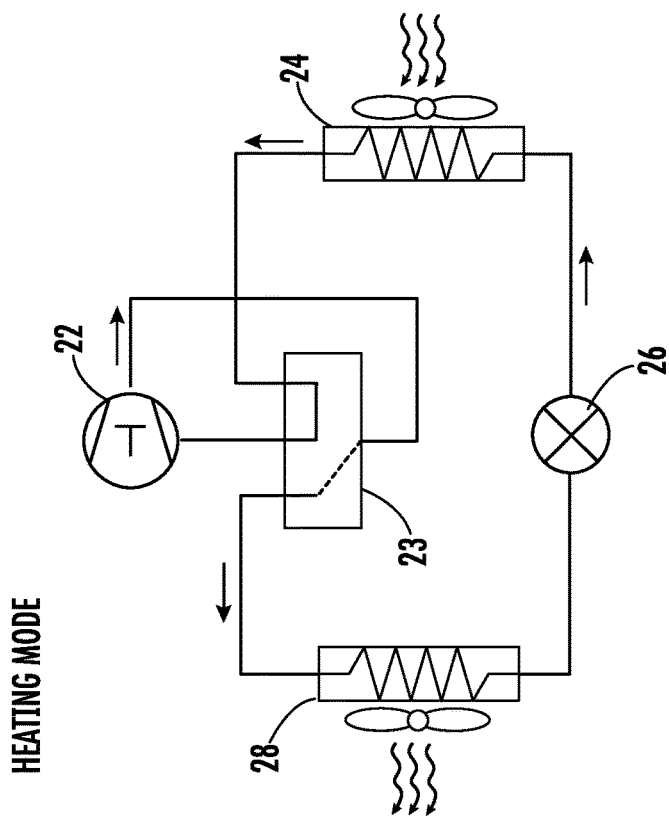
FIG. 1B is a schematic diagram of an exemplary heat pump in a heating mode according to an embodiment.
Figure 1A:
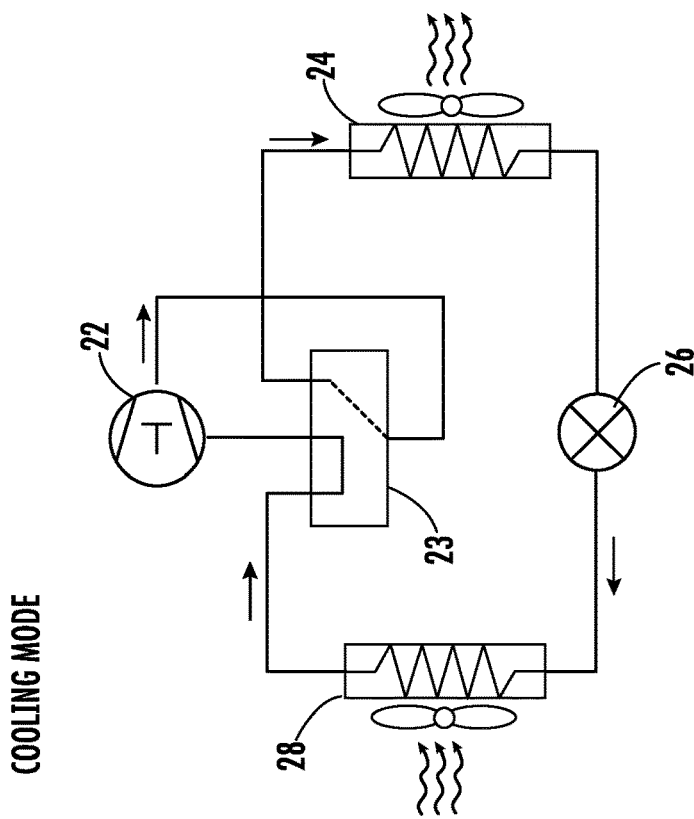
FIG. 1A is a schematic diagram of an exemplary heat pump in a cooling mode according to an embodiment.

With reference now to FIGS. 1A and 1B, schematic diagrams of an example of a basic vapor compression cycle of a heating, ventilation, and air conditioning (HVAC) system 20 is illustrated. The vapor compression cycle includes one or more compressors 22, a four-way reversing valve 23, a first heat exchanger 24, an expansion device 26, and a second heat exchanger 28. The first heat exchanger 24 and the second heat exchanger 28 may be configured with different internal volumes. This difference in internal volumes may be the result of using similar heat exchangers having different sizes or from using different types of heat exchangers. For example, the first heat exchanger 24 may be a microchannel heat exchanger and/or the second heat exchanger 28 may be a round tube plate fin heat exchanger. However, embodiments where the first heat exchanger 24 and/or the second heat exchanger 28 is another suitable type of heat exchanger are also contemplated herein. A fluid, such as a refrigerant for example, is configured to circulate through the vapor compression cycle in a first direction, such as in a counterclockwise direction for example.

As shown in FIG. 1, in operation, the compressor 22 receives a refrigerant vapor from the second heat exchanger 28 and compresses it to a high temperature and pressure. The relatively hot refrigerant vapor is then delivered to the first heat exchanger 24 where it is cooled and condensed to a liquid state via heat exchange relationship with a cooling medium C, such as air or water. Accordingly, when the first heat exchanger 24 receives the refrigerant output from the compressor 22, the first heat exchanger functions as a condenser. The cooled liquid refrigerant flows from the first heat exchanger 24 to the expansion device 26, such as an expansion valve for example, in which the refrigerant is expanded to a lower pressure where the temperature is reduced and the refrigerant may exist in a two-phase liquid/vapor state. From the expansion device 26, the refrigerant is provided to the second heat exchanger 28. Because heat is transferred from a secondary medium, such as air for example, to the refrigerant within the second heat exchanger 28, causing any refrigerant in the liquid phase to vaporize, the second heat exchanger 28 functions as an evaporator. From the second heat exchanger 28, the low-pressure vapor refrigerant returns to the compressor 22 so that the cycle may be repeated. This flow of refrigerant within the vapor compression cycle of the HVAC system 20 may be referred to herein as operation in a normal mode, also referred to herein as a first mode or cooling mode.

In embodiments where the HVAC system 20 is a heat pump, the flow of refrigerant within the vapor compressor cycle may be reversed to a second direction for operation in a second mode or heating mode, as shown in FIG. 1B. In such embodiments, the refrigerant may flow clockwise from the compressor 22 to the second heat exchanger 28, the expansion device 26, and the first heat exchanger 24 sequentially. In such instances, the refrigerant within the second heat exchanger 28 is cooled and condensed to a liquid state and the refrigerant within the first heat exchanger is heated to form a low-pressure vapor. Accordingly, when operating in this reverse flow direction, the second heat exchanger 28 functions as the condenser and the first heat exchanger 24 functions as the evaporator of the vapor compression cycle. In embodiments where the flow of refrigerant within the HVAC system 20 is reversible to allow operation in both a cooling and heating mode, the component of the HVAC system 20 may be divided between an indoor unit and an outdoor unit, as is known in the art. In such embodiments, the first heat exchanger 24 is arranged within the indoor unit and the second heat exchanger 28 is arranged within the outdoor unit.

Figure 2:
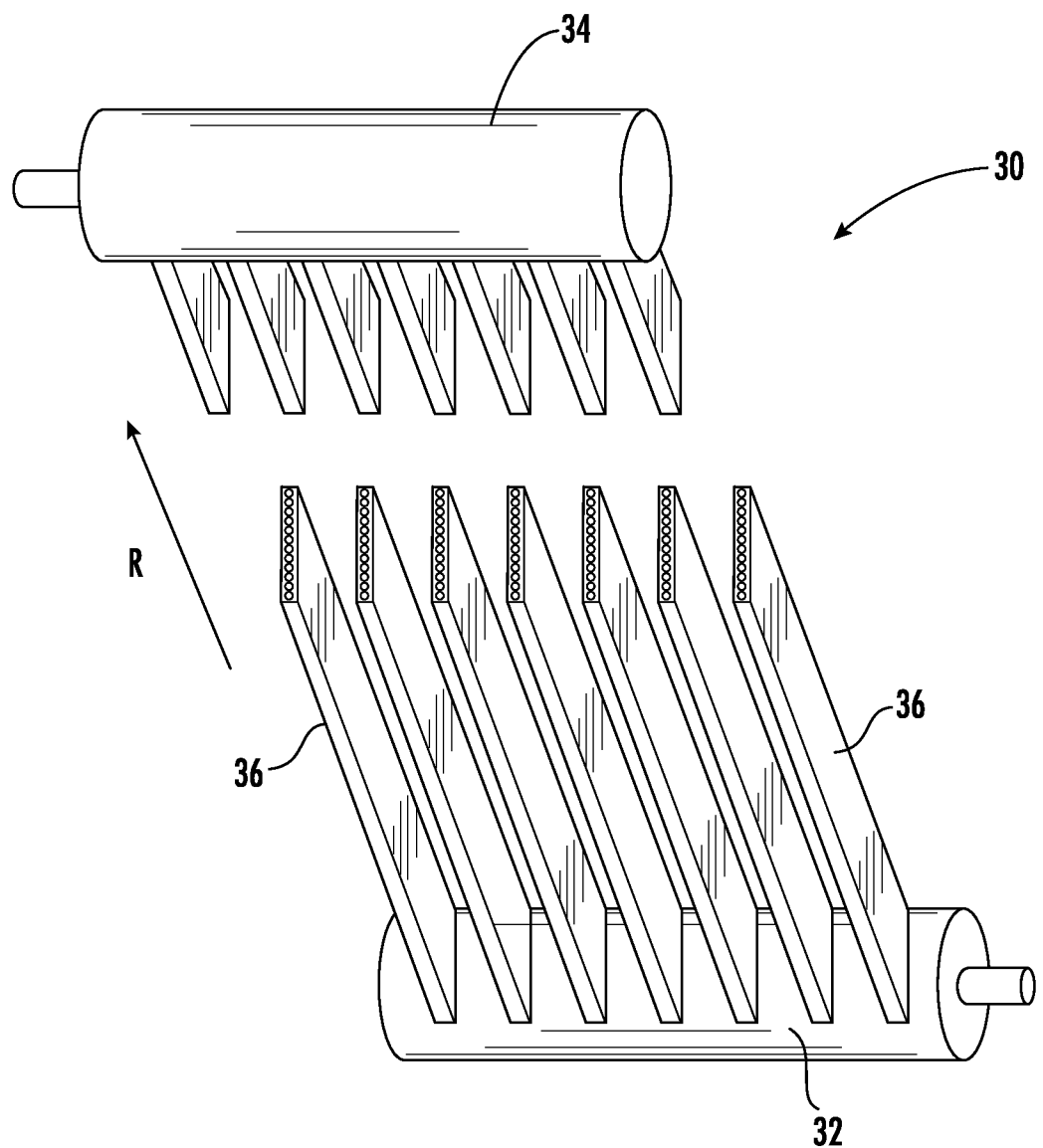
FIG. 2 is a perspective view of a microchannel heat exchanger according to an embodiment.
Figure 3:
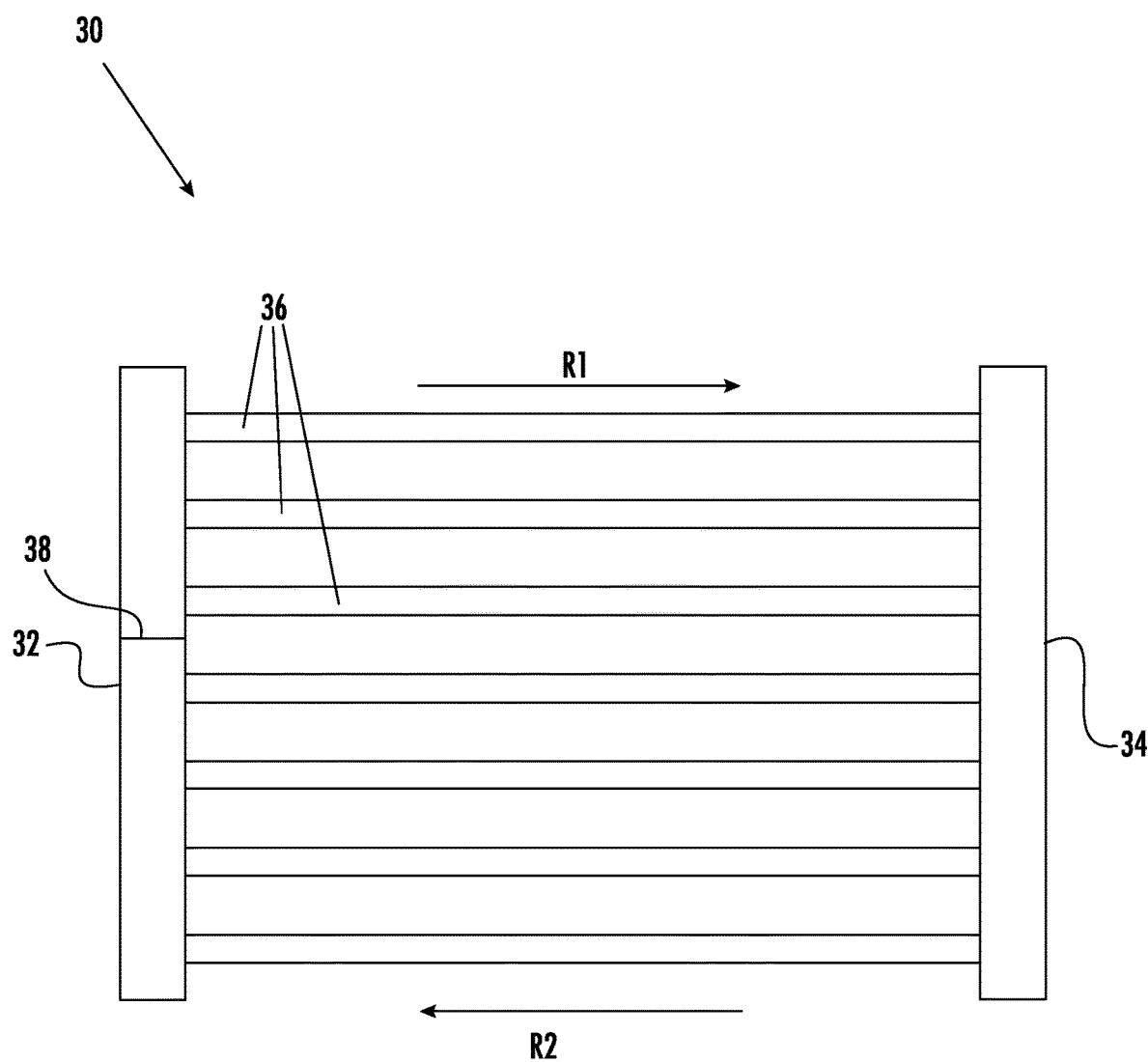
FIG. 3 is a side view of a microchannel heat exchanger according to an embodiment.
Figure 4:
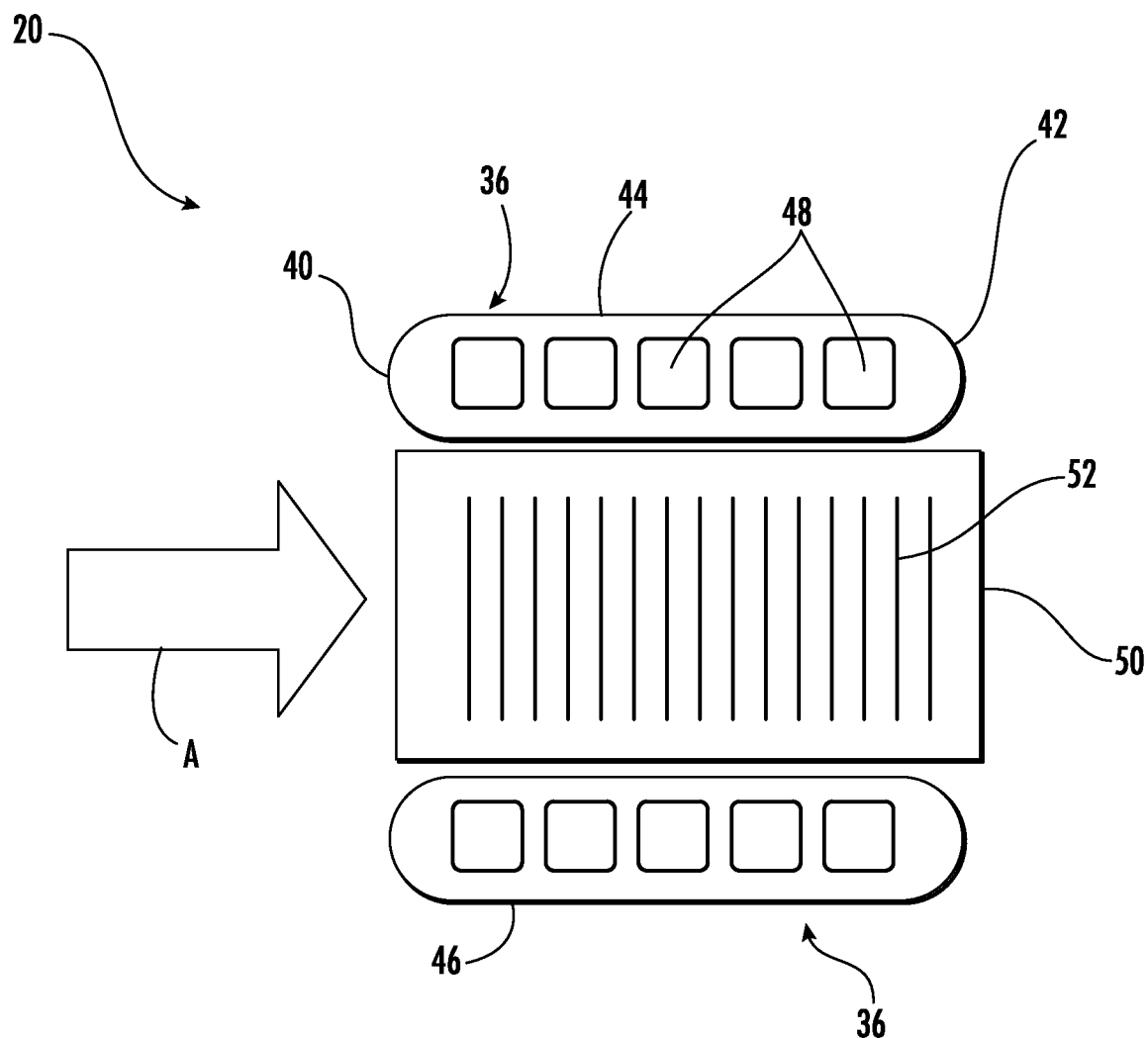
FIG. 4 is a cross-sectional view of a microchannel heat exchanger according to an embodiment.

With reference now to FIGS. 2-4, an example of a microchannel heat exchanger 30 suitable for use as the first heat exchanger 24 is illustrated in more detail. In the illustrated non-limiting embodiment, the microchannel heat exchanger 30 is a single tube bank microchannel heat exchanger; however, microchannel heat exchangers having multiple tube banks, as well as other types of heat exchangers, such as tube and fin heat exchangers for example, are within the scope of the invention. The heat exchanger 30 includes a first manifold or header 32, a second manifold or header 34 spaced apart from the first manifold 32, and a plurality of heat exchange tubes 36 extending in a spaced parallel relationship between and connecting the first manifold 32 and the second manifold 34. It should be appreciated that the headers may have a horizontal orientation as shown in FIG. 2, a vertical orientation as shown in FIG. 3, or another suitable orientation.

The heat exchanger 30 may be configured in a single pass arrangement, such that refrigerant flows from the first header 32 to the second header 34 through the plurality of heat exchange tubes 36 in the flow direction indicated by arrow R (FIG. 2). In another embodiment, the heat exchanger 30 is configured in a multi-pass flow arrangement. For example, with the addition of a divider or baffle 38 in the first header 32 (FIG. 3), fluid is configured to flow from the first manifold 32 to the second manifold 34, in the direction indicated by arrow R1, through a first portion of the heat exchanger tubes 36, and back to the first manifold 32, in the direction indicated by arrow R2, through a second portion of the heat exchanger tubes 36. As will be described in more detail below, the heat exchanger 30 may additionally include one or more guard or "dummy" tubes extending between its first and second manifolds 32, 34 at the sides of the tube bank. These "dummy" tubes do not convey refrigerant flow, but add structural support and protection to the tube bank.

Figure 5:
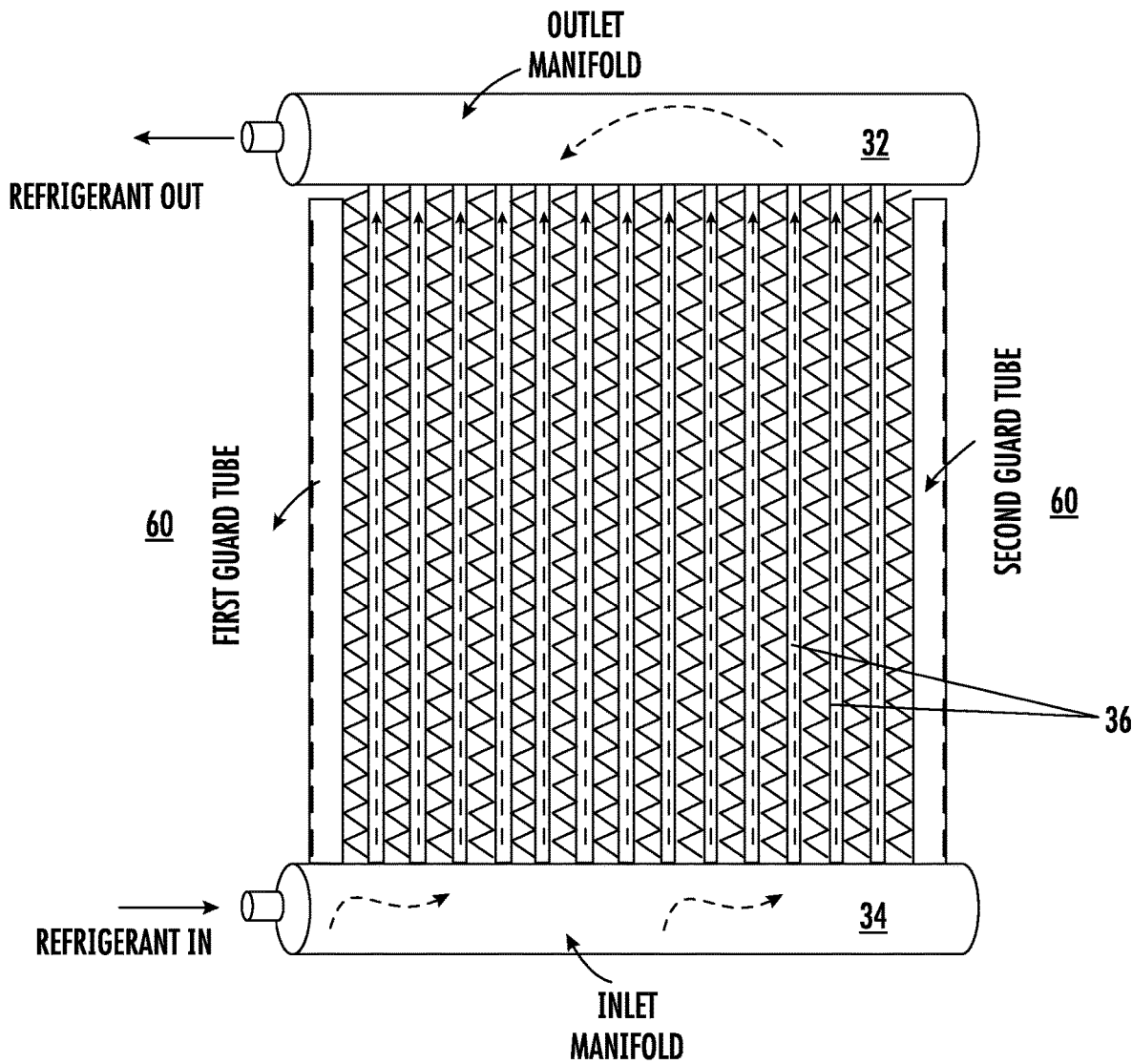
FIG. 5 is a side view of a microchannel heat exchanger including a dummy tube configured as a receiver according to an embodiment.

Referring now to FIGS. 4 and 5, each heat exchange tube 36 comprises a flattened heat exchange tube having a leading edge 40, a trailing edge 42, a first surface 44, and a second surface 46. The leading edge 40 of each heat exchange tube 36 is upstream of its respective trailing edge 42 with respect to an airflow A through the heat exchanger 30. The interior flow passage of each heat exchange tube 36 may be divided by interior walls into a plurality of discrete flow channels 48 that extend over the length of the heat exchange tubes 36 from an inlet end to an outlet end and establish fluid communication between the respective first and second manifolds 32, 34. The flow channels 48 may have a circular cross-section, a rectangular cross-section, a trapezoidal cross-section, a triangular cross-section, or another non-circular cross-section. The heat exchange tubes 36 including the discrete flow channels 48 may be formed using known techniques and materials, including, but not limited to, extruded or folded.

As known, a plurality of heat transfer fins 50 may be disposed between and rigidly attached, usually by a furnace braze process, to the heat exchange tubes 36, in order to enhance external heat transfer and provide structural rigidity to the heat exchanger 30. Each folded fin 50 is formed from a plurality of connected strips or a single continuous strip of fin material tightly folded in a ribbon-like serpentine fashion thereby providing a plurality of closely spaced louvers 52 that extend generally orthogonal to the flattened heat exchange tubes 36. Heat exchange between the fluid within the heat exchanger tubes 36 and air flow A, occurs through the outside surfaces 44, 46 of the heat exchange tubes 36 collectively forming the primary heat exchange surface, and also through the heat exchange surface of the louvers 52 of the folded fin 50, which form the secondary heat exchange surface.

Figure 6:
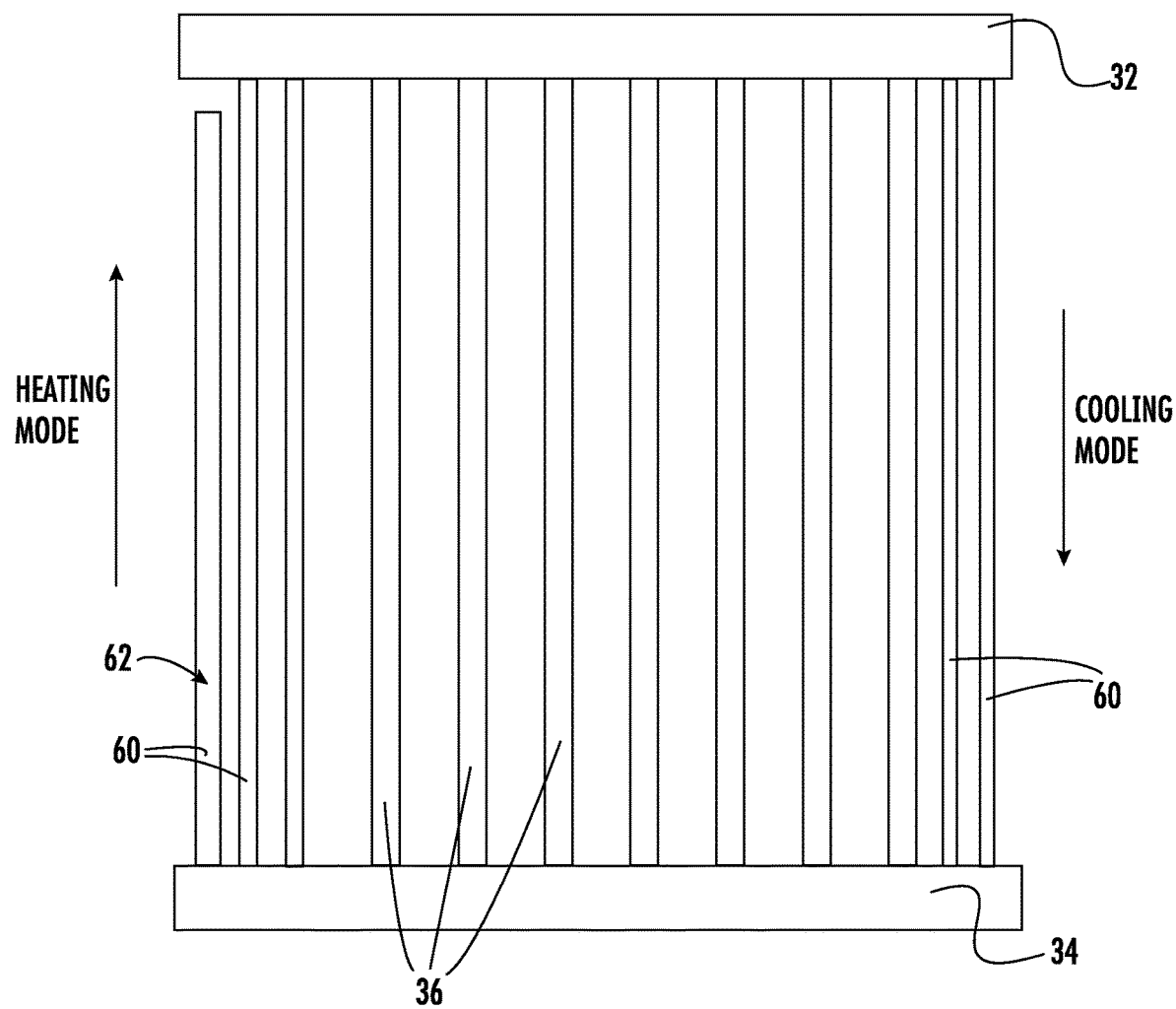
FIG. 6 is a side view of another microchannel heat exchanger including a dummy tube configured as a receiver according to an embodiment.

In an embodiment, the HVAC system 20 includes a receiver or compensator to selectively capture excess refrigerant charge when the system 20 is operating in the heating mode. With reference to FIGS. 5 and 6, in an embodiment, one or more of the dummy tubes 60 of the heat exchanger 30 are configured as the receiver 62. Although only a single dummy tube 60 is illustrated at each side of the active heat exchange tubes 36 of the heat exchanger 30 in FIG. 5, it should be understood that in other embodiments as shown in FIG. 6, a plurality of dummy tubes 60 may be arranged at one or both sides of the heat exchanger 30. Accordingly, in an embodiment, two or more dummy tubes (i.e., a first dummy tube and a second dummy tube) arranged at the same side of the heat exchanger 30 may be configured as a receiver 62. The two or more dummy tubes 60 may be adjacent dummy tubes, or may be separated by another dummy tube. Further, the two or more dummy tubes 60, may but need not be fluidly connected to one another at a location offset from a manifold. Alternatively, or in addition, two or more dummy tubes 60 arranged at opposite sides of the heat exchanger may each be configured as a receiver 62. In such embodiments, the number of dummy tubes configured to store refrigerant arranged at the first side of the heat exchanger 30 may be equal to or may vary from the number of dummy tubes 60 configured to store refrigerant arranged at a second side of the heat exchanger 30.

The at least one dummy tube 60 configured as a receiver 62 is arranged in fluid communication with one, but not both of the manifolds of the heat exchanger. In the illustrated, non-limiting embodiment, the dummy tube is arranged in fluid communication with the manifold that functions as the inlet header, but not the manifold that functions as the outlet header when the HVAC system 20 is in a heating mode. The at least one dummy tube 60 configured as a receiver 62, may but need not be mechanically coupled to both the first manifold 32 and the second manifold 34.

A configuration of the at least one dummy tube 60 operable as a receiver 62 may be substantially identical to the plurality of active tubes 36 of the heat exchanger 30. In such embodiments, refrigerant is stored within the one or more flow channels of the at least one dummy tube 60. However, in other embodiments, the dummy tube 60 may be substantially hollow, thereby increasing the internal volume for storing refrigerant therein. Alternatively, or in addition, the dimensions of the at least one dummy tube 60 operable as a receiver 62 may be the same, or may be different than other dummy tubes 60 or the active tubes 36 of the heat exchanger 30. For example, the overall size and shape of the receiver dummy tube 60 may be modified based on the total amount of the refrigerant charge to be stored therein and/or based on the sizing constraints of the housing surrounding the heat exchanger 30 and differences in the internal volumes of the two heat exchangers.

During operation of the HVAC system 20 in the heating mode, as a result of the extra refrigerant charge in the condenser (second heat exchanger 28), the at least one dummy tube 60 connected to outlet manifold operable as a receiver 62 is configured to fill with predominantly liquid-phase refrigerant. Any refrigerant in the form of vapor accumulated within the receiver 62 is effectively condensed due to heat transfer between the cooler air and the relatively warmer refrigerant. Similarly, in the cooling mode, the one or more dummy tubes 60 connected to inlet manifold operable as a receiver 62 may tend to fill with liquid-vapor mixture of refrigerant which is not desirable. Because the dummy tube 60 is in the airstream and participates in the heat transfer process, any liquid inside the dummy tube 60 is evaporated by the warmer air relative to the colder refrigerant. Furthermore, if the dummy tube 60 is suitably positioned higher than the inlet manifold, gravity will drain out any remaining liquid and prevent any liquid migrating to the dummy tube 60 receiver. Because excess liquid refrigerant is effectively stored in the dummy tube 60 in the condenser of the system in the heating mode and effectively returned to the system in the cooling mode, any charge imbalance in the two modes of operation is mitigated with simple and cost-effective concept when deploying microchannel heat exchangers along with other heat exchangers with larger internal volume disparity.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heating, ventilation, and air conditioning (HVAC) system comprising:
   a vapor compression cycle comprising a microchannel heat exchanger, wherein a fluid is configured to circulate within the vapor compression cycle in a first direction during a first mode and is configured to circulate within the vapor compression cycle in a second, opposite direction during a second mode; and
   a receiver integrally formed with the microchannel heat exchanger, the microchannel heat exchanger having:
   a first manifold;
   a second manifold;
   a plurality of heat exchange tubes extending between and fluidly coupling the first manifold and the second manifold, the plurality of heat exchange tubes having a plurality of discrete flow channels formed therein; and
   a plurality of dummy tubes mechanically connected to at least one of the first manifold and the second manifold, wherein at least one dummy tube of the plurality of dummy tubes configured as the receiver.

2. The HVAC system of claim 1, wherein the first mode is a cooling mode and the second mode is a heating mode.

3. The HVAC system of claim 1, wherein a configuration of the at least one dummy tube configured as the receiver is substantially identical to the configuration of one of the plurality of heat exchange tubes.

4. The HVAC system of claim 1, wherein the HVAC system is a heat pump having an indoor unit and an outdoor unit, the microchannel heat exchanger being arranged within the indoor unit.

5. The HVAC system of claim 1, wherein the vapor compression cycle further comprises another heat exchanger, wherein an inner volume of the another heat exchanger is different than the inner volume of the microchannel heat exchanger.

6. The HVAC system of claim 1, wherein the vapor compression cycle further comprises another heat exchanger and the another heat exchanger is not a microchannel heat exchanger.

7. The HVAC system of claim 1, wherein the at least one dummy tube configured as the receiver is fluidly connected to the second manifold but not the first manifold.

8. The HVAC system of claim 7, wherein the second manifold is operable as an inlet header during operation of the vapor compression cycle in the second mode.

9. The HVAC system of claim 1, wherein has an increased internal volume compared to the plurality of heat exchange tubes.

10. The HVAC system of claim 9, wherein the at least one dummy tube configured as the receiver has a substantially hollow interior.

11. The HVAC system of claim 9, wherein at least one of a size and shape of the at least one dummy tube configured as the receiver is different from the size and shape of the plurality of heat exchange tubes.

12. The HVAC system of claim 1, wherein the at least one dummy tube configured as the receiver further comprises a plurality of dummy tubes including a first dummy tube and a second dummy tube.

13. The HVAC system of claim 12, wherein the first dummy tube and the second dummy tube are arranged at a same side of the microchannel heat exchanger.

14. The HVAC system of claim 12, wherein the first dummy tube and the second dummy tube are arranged at opposite sides of the microchannel heat exchanger.

15. The HVAC system of claim 12, wherein the first dummy tube and the second dummy tube are fluidly coupled at a location offset from the first manifold and the second manifold.

* * * * *